United States Patent
Shao et al.

(10) Patent No.: US 7,581,866 B2
(45) Date of Patent: Sep. 1, 2009

(54) REPLACEABLE LAMP MODULE FOR LIQUID CRYSTAL DISPLAY

(75) Inventors: Tung-liang Shao, Hsin-Chu (TW); Chi-chun Yang, Hsin-Chu (TW); Ye-hen Chien, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 110 days.

(21) Appl. No.: 11/622,807

(22) Filed: Jan. 12, 2007

(65) Prior Publication Data

US 2008/0013340 A1 Jan. 17, 2008

(30) Foreign Application Priority Data

Jul. 14, 2006  (TW) ................. 95125963 A

(51) Int. Cl.
*F21V 33/00* (2006.01)
*G02F 1/1335* (2006.01)

(52) U.S. Cl. .............. 362/614; 362/634; 349/58

(58) Field of Classification Search ............. 362/614, 362/634, 225, 260, 630, 217.14; 349/58, 349/60, 67, 65, 70
See application file for complete search history.

(56) References Cited

U.S. PATENT DOCUMENTS

| | | | |
|---|---|---|---|
| 5,537,296 A * | 7/1996 | Kimura et al. .............. 362/634 |
| 5,815,227 A * | 9/1998 | Lee ............................. 349/67 |
| 6,309,081 B1 | 10/2001 | Furihata | |
| 6,545,732 B2 * | 4/2003 | Nakano ...................... 349/58 |
| 7,004,613 B2 * | 2/2006 | Sun et al. .................... 362/630 |
| 7,004,614 B2 * | 2/2006 | Tsai et al. ................... 362/633 |
| 7,325,963 B2 * | 2/2008 | Chang et al. ................ 362/633 |
| 7,448,784 B2 * | 11/2008 | Tanaka ...................... 362/611 |
| 2006/0018131 A1 * | 1/2006 | Kim .......................... 362/634 |
| 2006/0285361 A1 * | 12/2006 | Cok .......................... 362/633 |

FOREIGN PATENT DOCUMENTS

CN    1246636 A    3/2000

* cited by examiner

*Primary Examiner*—Stephen F. Husar
*Assistant Examiner*—Peggy A. Neils

(57) ABSTRACT

A lamp module for use in a liquid crystal display includes a lamp tube, a reflector, a dismantling mechanism disposed on the reflector. The reflector comprises a first side, a second side, and a third side forming a sink, for accommodating the lamp tube and reflecting light from the lamp tube. The dismantling mechanism disposed on the reflector and outside a bezel of the liquid crystal display when the lamp module is assembled to the liquid crystal display. The lamp module is capable of being disassembled from the bezel of the liquid crystal display by applying a force on the dismantling mechanism.

7 Claims, 2 Drawing Sheets

REPLACEABLE LAMP MODULE FOR LIQUID CRYSTAL DISPLAY

BACKGROUND OF THE INVENTION

1. Field of the Invention

The present invention relates to a replaceable lamp module for use in a liquid crystal display, and more particularly, to a replaceable lamp module with a dismantling mechanism for use in a liquid crystal display.

2. Description of the Related Art

Backlight module including a light source, optical films and a bezel, is employed as a backlight source for a Liquid Crystal Display (LCD). At present, the widely used light source is an Electro Luminescence (EL), a Cold Cathode Fluorescent Lamp (CCFL) and a Light Emitting Diode (LED).

However, the electro luminescence and the light emitting diode are mainly used in small size and single chromatic (green or red) LCD. Recently, the white light (panchromatic) EL and the light emitting diode as the light source are applied to electrical devices having a smaller-than-4-inches size LCD such as a mobile phone and a personal digital assistant (PDA), because insufficient luminance of the electro luminescence and the light emitting diode is a disadvantage for the use in a larger size LCD. Therefore, a cold cathode fluorescent lamp is the widely-used light source for the LCD requiring a full-chromatic and large size LCD.

A backlight module for use in a liquid crystal display, disclosed in U.S. Pat. No. 5,815,227, includes a light inducing plate at the bottom of the LCD, a lamp set at a side of the light inducing plate, and a lamp cover for reflecting light from the lamp toward light inducing plate. The lamp and the lamp cover serves as a lamp module which is fixed or detached on the light inducing plate by means of a locking mechanism. The locking mechanism contains two pairs of locking protrusions set on the upper and bottom surface of the light inducing plate, and two pairs of locking holes defined at the lamp cover. The lamp module can be fixed on the light inducing plate when the locking protrusions are fastened with the locking holes.

Another backlight device for use in the LCD, disclosed in U.S. Pat. No. 5,280,372, comprises a light transmitting plate in parallel to liquid crystal elements, a light source close to the light transmitting plate, a reflector for reflecting light from the light source toward the light transmitting plate, and a frame for supporting the backlight device. The light source, a cold cathode fluorescent lamp, is connected to a lead wire and a connector to get required power energy.

A combination of the light source and the reflector serve as a lamp tube unit. The backlight device has a guide rail along which the reflector is capable of sliding. In this way, once the CCFL is in malfunction or in exhaustion, the lamp tube unit can be detached by means of the slide mechanism. Then the lamp tube unit with a replacement of a new CCFL can be assembled by means of the slide mechanism.

Unfortunately, in the process of disassembling the conventional lamp tube unit, the operator has to pull the wire connected with the CCFL to make the lamp tube unit detached from the LCD. This action causes to damage a connection of the wire and the CCFL, resulting in an increase in failure possibility of Hi-pot test and the risk of lamp cable burnout.

Accordingly, it is necessary for designing a lamp module which can be disassembled from the LCD without pulling the wire connected with the CCFL, thereby reducing failure possibility of Hi-pot test and the risk of lamp cable burnout.

SUMMARY OF THE INVENTION

It is therefore an objective of the invention to provide a replaceable lamp module for use in a liquid crystal display. The lamp module comprises a dismantling mechanism at which a force can be applied when the lamp module is disassembled from the LCD without pulling the wire connected with the lamp tube, thereby reducing failure possibility of Hi-pot test and the risk of lamp cable burnout.

The lamp module for use in a liquid crystal display comprises a lamp tube, a reflector, a dismantling mechanism disposed on the reflector. The reflector comprises a first side, a second side and a third side, wherein the first side, the second side and the third side form a sink for accommodating the lamp tube and reflecting light from the lamp tube. When the lamp module is assembled to the liquid crystal display, the dismantling mechanism disposed on the reflector is outside a bezel of the liquid crystal display. The lamp module is capable of being disassembled from the bezel of the liquid crystal display by applying a force on the dismantling mechanism.

According to the present invention, the dismantling mechanism can have a concave, an opening or a bulge.

According to the present invention, the lamp module further comprises a wire electrically connected to the lamp tube, a first flexible pad enclosing an end of the lamp tube away from the dismantling mechanism, and a second flexible pad enclosing the other end of the lamp tube and the wire.

According to the present invention, the reflector comprises a first side, a second side and a third side. A length of the first side from the second side upwards is longer than that of the third side from the second side upwards.

The disclosed inventions will be described with references to the accompanying drawings, which show important example embodiments of the inventions and are incorporated in the specification hereof by related references.

DETAILED DESCRIPTION OF THE PREFERRED EMBODIMENT

Figure 1:
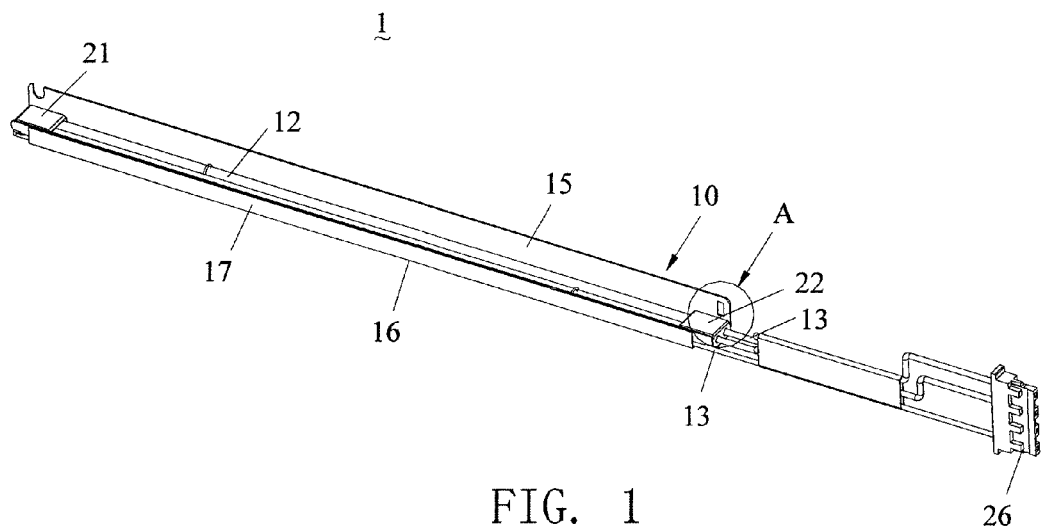
FIG. 1 shows a lamp module in accordance with a preferred embodiment of the present invention.
Figure 2:
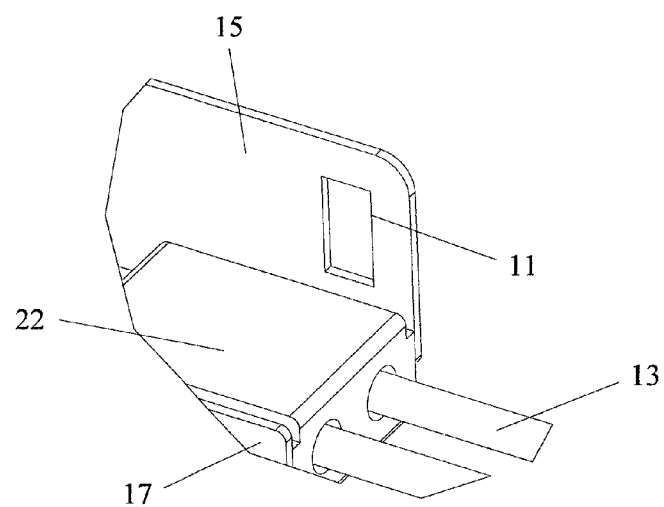
FIG. 2 shows an enlarged diagram of region A shown in FIG. 1.

Please refer to FIGS. 1 and 2. FIG. 1 shows a lamp module 1 in accordance with a preferred embodiment of the present invention. FIG. 2 shows an enlarged diagram of region A shown in FIG. 1. The lamp module 1 for use in a LCD display comprises a reflector 10, a lamp tube 12, a wire 13 and a connector 26. The reflector 10 longitudinally encloses at least side of the lamp tube 12 and defines a dismantling mechanism 11 thereon. One terminal of the wire 13 is electrically connected to one end of the wire 13, bent toward the other end of the lamp tube 12 adjacent to the dismantling mechanism, is electrically connected to a power supply (not shown) via the connector 26.

The reflector 10 comprises a first side 15, a second side 16 extending in a horizontal direction perpendicular to the first side 15, and a third side 17 in parallel with the first side 15. The first side 15, the second side 16 and the third side 17 forms a sink for positioning the lamp tube 12. The dismantling mechanism 11 is disposed on an end of the first side 15.

Figure 3:
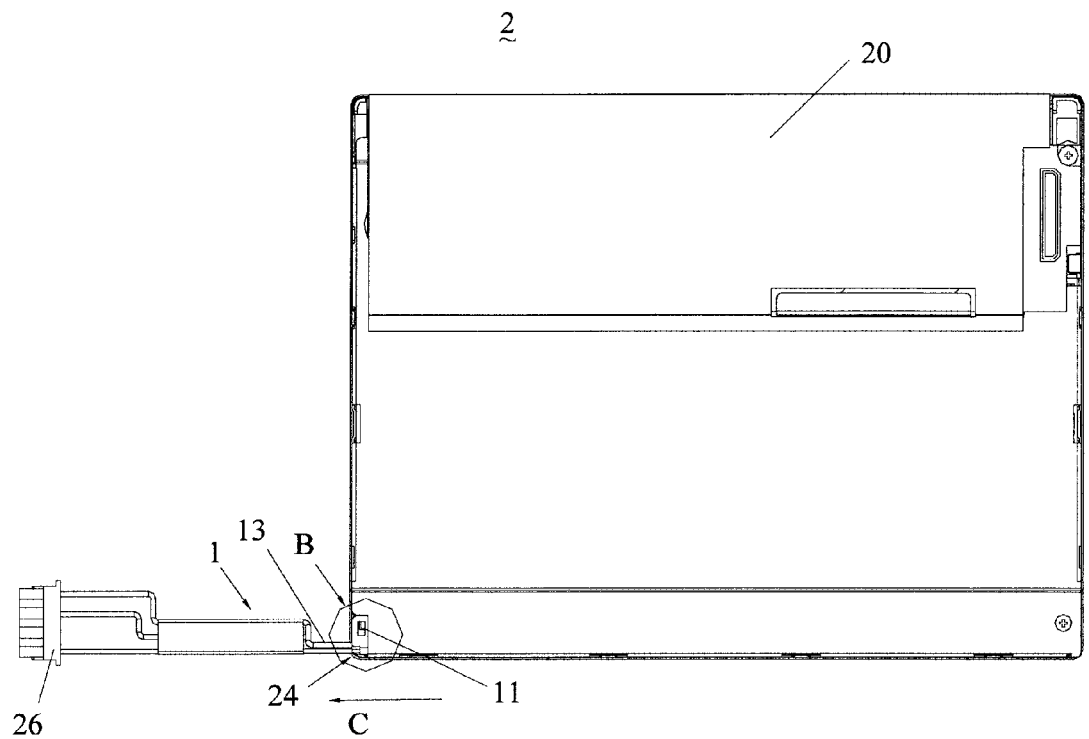
FIG. 3 shows a lamp module assembled with a bezel of the LCD display.
Figure 4:
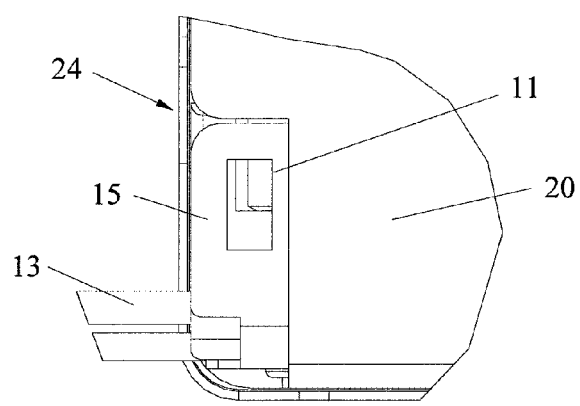
FIG. 4 is an enlarged diagram of region B in FIG. 3.

Please refer to FIG. 3 and FIG. 4. FIG. 3 shows a lamp module 1 assembled with a bezel 20 of the liquid crystal display 2. FIG. 4 is an enlarged diagram of region B in FIG. 3. In a process of assembling the lamp module 1 to the bezel 20 of the liquid crystal display 2, the lamp module 1 passes through an opening 24 on a side of the liquid crystal display 2, and is positioned into the bezel 20. At this moment, the dismantling mechanism 11 is outside the bezel 20. When disassembling the lamp module 1 from the bezel 20, the user applies a force along the direction of arrow C at the dismantling mechanism 11, thereby detaching the lamp module 1 from the opening 24 of the bezel 20.

As shown in FIG. 2, preferably, the dismantling mechanism 11 is an opening. In addition, the dismantling mechanism 11 may be a concave or a bulge which can be clasped by a user's finger or with a tool.

The lamp tube 12 of the lamp module 1 comprises a first flexible pad 21 and a second flexible pad 22. The first pad 21 encloses an end of the lamp tube 12 away from the dismantling mechanism 11. The second pad 22 encloses the other end of the lamp tube 12 and the wire 13.

Preferably, a length of the first side 15 from the second side 16 upwards is longer than that of the third side 17 from the second side 16 upwards. Moreover, the length of height of the second pad 22. The reflector 10, a lamp reflector, is used for reflecting light generated from the lamp tube 12. The first, second and third sides 15, 16, 17 are made of thin metal.

As shown in FIGS. 3 and 4, if the lamp tube 12 is in need of replacing, the lamp module 1 is easily disassembled from the bezel 20 without pulling the wire 13 by applying a force at the dismantling mechanism 11 with a user's fingers or tools. Then, the user can replace a new lamp tube 12 into the lamp module 1, and assembles the lamp module 1 into the bezel 20.

Although the present invention has been explained by the embodiments shown in FIGS. 1-4 described above, it should be understood to the ordinary skilled person in the art that the invention is not limited to the embodiments. For example, the dismantling mechanism 11 can be but not limited to a circle hole, a concave, a bulge and so on.

In contrast to prior art, the present invention lamp module provides a dismantling mechanism on the reflector. The process of disassembling the lamp module from the bezel can be easily realized without pulling the wire connected with the lamp tube. Consequently, the present invention lamp module has smaller volume, and reduces failure possibility of Hi-pot test and the risk of lamp cable burnout when disassembled from the bezel of the LCD.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module for use in a liquid crystal display, comprising:
   a bezel comprising an opening; and
   a lamp module comprising:
      a lamp tube;
      a reflector including a first side, a second side and a third side, wherein the first side, the second side and the third side form a sink for accommodating the lamp tube and reflecting light from the lamp tube, the first side is in parallel to the third side, and both the first and the third sides are substantially perpendicular along a horizontal direction to the second side; and
      a dismantling mechanism disposed on the first side of the reflector;
   whereby the lamp module is assembled to the bezel passing through the opening, and the dismantling mechanism is exposed to the opening when the lamp module is assembled to the bezel and the lamp module is disassembled from the bezel through applying a force on the dismantling mechanism along a direction parallel to a long axis of the lamp tube.

2. The backlight module of claim 1, wherein the dismantling mechanism has a concave.

3. The backlight module of claim 1, wherein the dismantling mechanism has an opening.

4. The backlight module of claim 1, wherein the dismantling mechanism has a bulge.

5. The backlight module of claim 1, wherein the first side extending upward from the second side has a length greater than the length of the third side extending upward from the second side.

6. The backlight module of claim 1, wherein the lamp module further comprises a wire electrically connected to the lamp tube.

7. The backlight module of claim 6, wherein the lamp module further comprises a first flexible pad enclosing an end of the lamp tube away from the dismantling mechanism, and a second flexible pad enclosing the other end of the lamp tube and the wire.

* * * * *